Patented Mar. 25, 1952

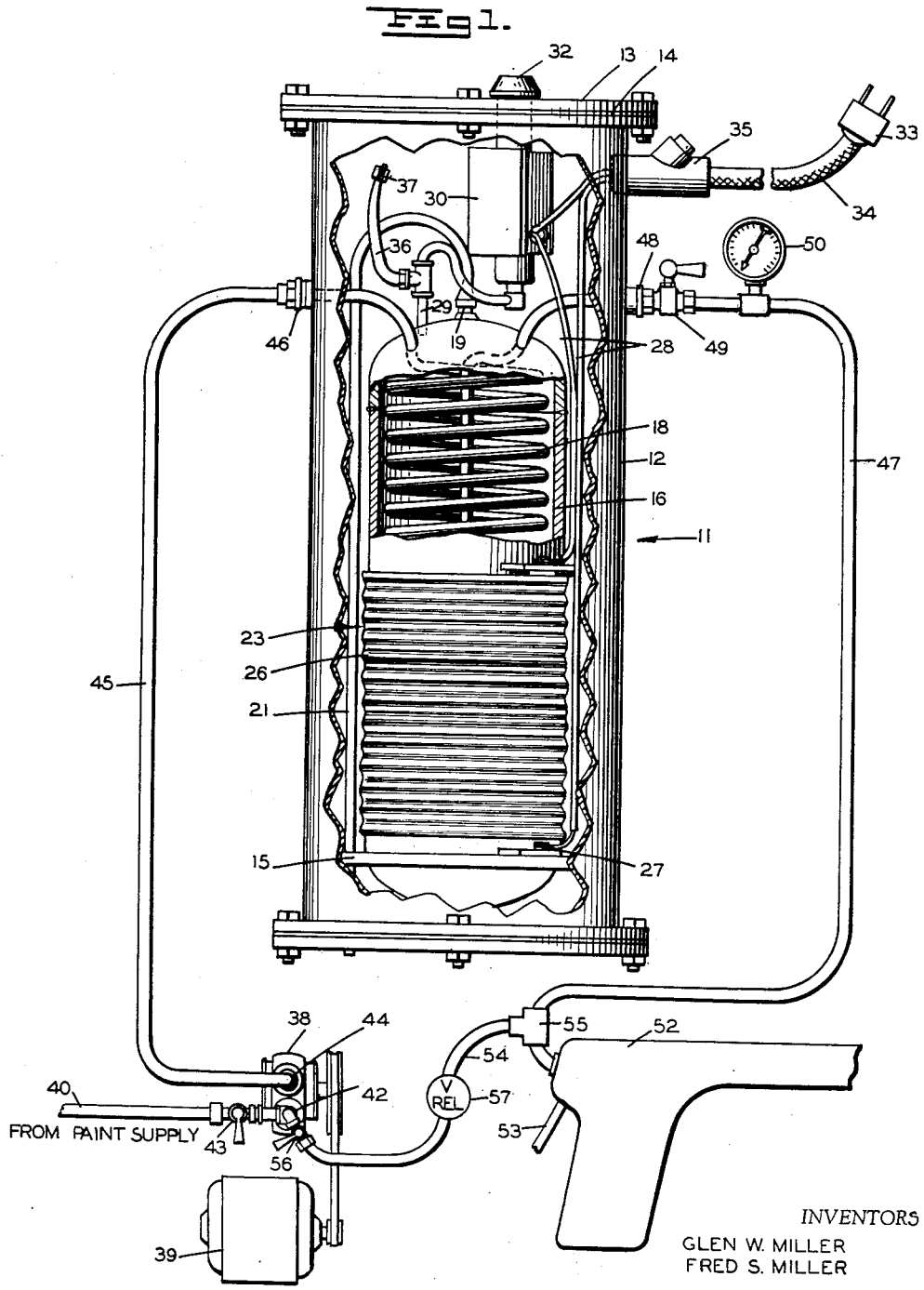

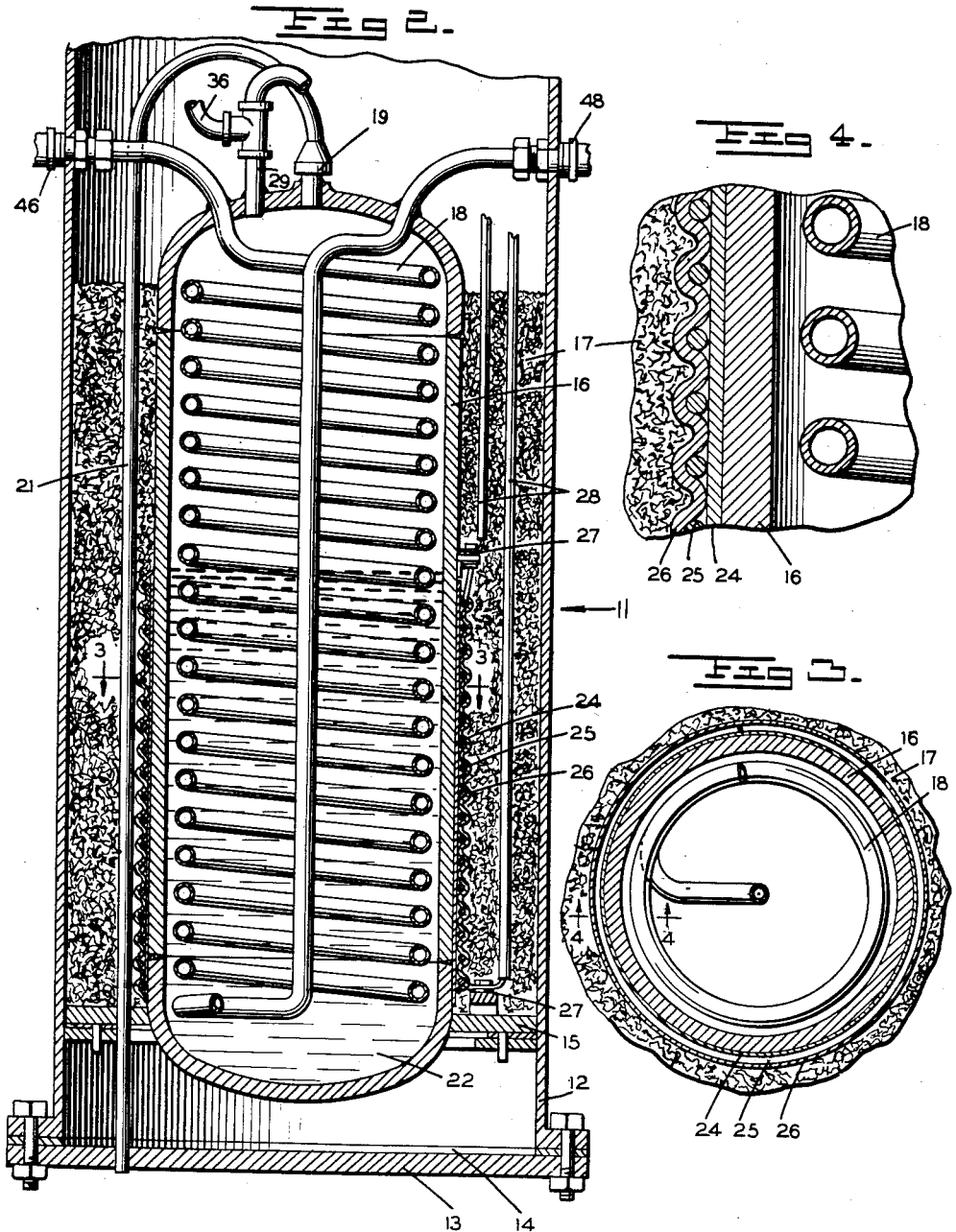

2,590,442

UNITED STATES PATENT OFFICE 2,590,442

HEATING DEVICE

Glen W. Miller, Covina, and Fred S. Miller, Monrovia, Calif.

Application September 6, 1949, Serial No. 114,142

2 Claims. (Cl. 219—39)

This invention relates to a heating device, and more particularly to a heating and circulating system especially adapted for paint spraying.

As is well known, the viscosity of paint materials generally is lowered by raising their temperature, and may be readily and closely controlled by regulating the temperature thereof. By the expedient of heating before spraying, the amount of thinner required to reduce the paint to spraying viscosity may be reduced by half or more. Also, less spraying time is required, reducing labor cost and overhead, and less paint is required, by reason of the elimination of overspray under controlled conditions. Similarly, a saving in atomizing air for the spray guns is effected. Two to three times the amount of paint solids may be applied at one application without sagging or running, giving film thickness equivalent to two or three coats. Greater film thickness with less thinner evaporation, and consequently less shrinkage, covers metal imperfections better, and gives greater gloss with less orange peel effect.

It is an object of the present invention, therefore, to provide a novel, efficient heating device adapted to controllably and uniformly heat material passing continuously therethrough.

It is a further object of this invention to provide an automatically controlled, continuously operating heating device.

A further object is to provide a continuously operating heating device automatically controlled by the vapor pressure of a heat exchange liquid employed therein.

Another object is to provide a novel heating device employing a hermetically sealed liquid-vapor equilibrium system for heat transfer.

Still another object is to provide a material heating and circulating system effective to provide material at an outlet point at constant temperature and viscosity, regardless of the material use rate at the outlet point.

Yet another object is to provide a paint heating and circulating system adapted to supply paint to a spray gun at constant temperature and viscosity, and at a volumetric rate exceeding the capacity of the gun, excess paint being returned and recirculated through the heating device.

Further objects will be in part obvious and in part pointed out hereinafter.

The invention and the novel features thereof may best be made clear from the following description and the accompanying drawings, in which:

Figure 1 is an elevational view, somewhat diagrammatic, of an exemplary paint heating and circulating system illustrative of the present invention, partly broken away to show the interior of the heating device employed therein;

Figure 2 is a sectional, elevational view showing details of the heating device of the present invention;

Figure 3 is a sectional view taken on the line 3—3 of Figure 2, and

Figure 4 is an enlarged view of the heating vessel wall and the heating element associated therewith, taken on the line 4—4 of Figure 3.

Referring to the drawings, in Figure 1 is shown a heating device indicated generally as 11, comprising a cylindrical casing 12, closed at both ends by plates 13 and preferably sealed, as by gaskets 14. Suitably positioned and supported within the casing, as by ring 15, is the heating vessel 16. If desired, as shown in Figure 2, the annular space between the casing and the vessel may be packed with a heat insulating material 17.

As best shown in Figure 2, the vessel 16 is of rigid construction and hermetically sealed, and encloses a heating coil 18, the ends of which pass through the vessel walls, preferably adjacent the top thereof. The vessel also desirably includes a "safety head" or pressure relief valve 19, which may be coupled to a gooseneck tube 21, leading to and directed through the bottom of the casing. The vessel includes also an appropriate quantity of heat transfer liquid 22, the vapor of which, as will presently be more fully apparent, serves as the primary heat transfer medium.

The lower portion of the vessel is enclosed by a heating blanket indicated generally as 23, comprising (see Figure 4) an insulating layer 24 of glass cloth or equivalent material wrapped around the vessel, a helical heating element 25 enclosing the layer 24, and, preferably, an outer layer 26 of insulating material, such as fiber glass tape. The ends of the element 25 are connected to terminals 27, to which are also connected the electrical conductors 28.

Through filling tube 29, the interior of the vessel is open to a conventional pressure actuated switch control 30, provided with the usual adjustment knob 32, for varying the response pressure of the control. As shown, the control 30 may conveniently be mounted below the upper casing plate 13, with the adjustment knob 32 extending through and positioned above the plate. Current is supplied to conductors 28 through the plug 33, from any suitable source of power, the conductors being introduced into the casing through cable 34 and condulet 35. As is evident in Figure 1, one conductor 28 is connected directly to a heating blanket terminal 27, and the other conductor is connected to the other terminal through the switch control 30. The filling tube 29 is provided with a branch 36, suitably stopped off, as by clamp 37.

In Figure 1, the heating device 11 is shown as an integral element of a paint heating and circulating system, comprising a positive displacement pump 38, suitably driven by any convenient source of power, such as motor 39. Paint is conveyed to the pump through a feed conduit 40, connected to the pump inlet 42 through valve 43. From the pump outlet 44, supply conduit 45 extends to the casing wall, whereat it is connected to an end of heating coil 18 by means of connector 46. The other end of the coil 18 extends to the casing wall, whereat it is connected to supply conduit 47 by connector 48. The conduit 47 may be of rigid or flexible material, as required. The supply conduit 47 may be provided with a stop cock 49, preferably adjacent connector 48, and a temperature gauge 50. The supply conduit 47 extends to and is connected to a conventional spray gun 52, provided also with the usual air tube 53, for the supply of atomizing air thereto.

From the portion of conduit 47 adjacent gun 52, a return conduit 54 branches off therefrom through T 55 and extends to the pump inlet 42, being connected thereto through a valve 56. The return conduit may comprise means to restrict the flow of paint therethrough, such as the pressure relief valve 57.

The heating vessel, as previously stated, is partially filled with a heat exchange liquid 22, as indicated in Figure 2, and is substantially evacuated thereabove, the remaining space in the vessel containing only the vapor of the heat exchange liquid. As will be evident, the liquid may be inserted into the vessel after assembly by means of filling tube 29, and the vessel then evacuated through branch 36, the branch being sealed off after the evacuation, as by the clamp 37. The evacuation of air from the vessel will be assisted by the vapor of the heat exchange liquid, which may be slightly heated to assist the process by flushing. The vessel thereafter is kept hermetically sealed, all openings thereinto being air-tight.

The pressure within the vessel of course, will always be substantially the vapor pressure of the heat exchange liquid at the temperature of the system. As heat is applied to the vessel, as by means of heating blanket 23, the liquid-vapor equilibrium shifts accordingly, the vapor pressure rising with the system temperature. By utilizing the vapor pressure of the heat transfer liquid to control the external heating element, by means of the pressure actuated switch control, it has been found that outstanding system temperature uniformity may be achieved. It will be apparent that other than electrical means may be utilized to apply heat to the device, if desired, said other means being similarly controlled by the pressure internal of the vessel.

Carbon tetrachloride has been found to be a suitable heat transfer liquid. Water may also be employed. When water is used, a greater volume thereof should be employed than in the case of carbon tetrachloride, and it is desirable to add a small partial pressure of inert gas, such as nitrogen, to the otherwise evacuated system, in order to raise the operating pressure to a more satisfactory level for the use of commercial pressure control devices. It will be understood that by the term "evacuated" is meant substantially free of non-condensible gases. Vapor of the heat transfer liquid, obviously, will always be present, and also in some cases, as indicated, a small partial pressure (for example, about seven inches of mercury) of inert gas.

The material to be heated is circulated through the interior of coil 18, which may be coiled as shown or otherwise convoluted, and is preferably designed so that the material circulated therethrough will attain a temperature very close (within 1° or 2°) to the system temperature at the maximum rate of flow expected. The heat transfer characteristics of the device are excellent, heat being transferred to the material through the walls of coil 18, primarily by contact of the vapor therewith and resultant condensation of the vapor, the condensate running down the coil or dripping into the main body of liquid 22. The exit temperature of the material being heated may be varied by adjustment of the knob 32, whereby the response pressure of the switch control 30 is altered, and the uniformity of the issuing material temperature is limited substantially only by the sensitivity of the pressure actuated control.

The heating device described above is of particularly outstanding utility in the paint heating and circulating system illustrated in Figure 1. As there shown, paint is conveyed to the pump 38 through feed conduit 40 from a suitable source of supply (not shown), and by the action of the pump supplied to the spray gun 52 through a closed passage including conduit 45, coil 18 and conduit 47. The paint emerging from coil 18 will be heated to the desired temperature as controlled by the adjustment knob of switch control 30, and the temperature gauge 50 may be utilized to provide a convenient check on the paint temperature. The paint, then, is supplied to gun 52 and utilized with all the advantages previously listed. For applications wherein the operation of the spray gun is continuous and at a constant spray rate, the system need comprise only these elements, in such case the volumetric capacity of the pump being substantially equal to the spray rate of the gun.

In the more common case, however, wherein the operation of the spray gun is discontinuous, or the spray rate thereof is variable, it has been found desirable to employ a pump having a volumetric capacity exceeding the maximum spray rate of the gun, for example, by a ratio of two to one, providing a return line from the gun, or from the supply line in the vicinity of the gun, to the inlet of the pump. As shown in the drawing, means for this purpose may comprise the T 55 in conduit 47 adjacent the gun 52, and the return conduit 54 extending from the T to the pump inlet 42. In order to maintain a constant pressure of paint at the gun, it may be desirable to include in the return conduit 54 means for restricting the passage of paint therethrough, such as pressure relief valve 57. In some cases, the paint may be supplied to feed conduit 40 under pressure, and the pump 38 employed solely to overcome friction in the circulating system, whereby the need for a restriction in return conduit 54 would be obviated.

The circulating system including a pump of relatively high volumetric capacity and the return conduit has proved highly advantageous in applications wherein the spray rate of the gun is variable or intermittent, assuring under all conditions a supply of paint at the gun of constant temperature, varying only very slightly regardless of the continuity or rate of the spraying operation. The constancy of paint temperature and viscosity at the gun is substantially maintained even though the conduit 47 from the heating device thereto be relatively long, in which case the advantages of the system are especially desirable.

The system may be readied for use by the application of current to plug 33, and in systems of average capacity the heating device is up to temperature and ready for operation in a very short period, fifteen minutes or less. The pump 38 may then be started and the gauge 50 observed until the reading thereof is constant. If necessary, knob 32 may be adjusted until the gauge reading is constant at the desired temperature. The system is then ready for use and the gun 52 may be operated as required, the supply of paint thereto being maintained at constant temperature and viscosity as previously set forth.

At the termination of spraying operations, the system may be readily cleaned merely by supplying thinner or other cleaning fluid to the feed conduit 40, whereby the thinner will be circulated througout the system and the entire system flushed in short order. As shown, the pump and heating device are desirably independently operable and controlled, whereby the pump may be employed while the heating device is inoperative, and the heating device may be activated while the pump is inoperative.

As previously indicated, paint supplied to feed conduit 40 need have only a small fraction of the amount of thinner normally required for spray operations. The heating and circulating system being entirely closed, no evaporation of thinner occurs therein. The system may be employed with uniformly excellent and consistent results throughout daily and seasonal fluctuations in temperature and humidity, being substantially unaffected by ambient conditions.

The supply conduit 47 may be operatviely engaged to a plurality of spray guns, if desired. A single heating device may enclose two or more coils, each coil constituting part of a distinct circulating system. Multiple guns may be supplied in this manner also, and different colors may be sprayed simultaneously or alternately.

The term "paint" as used herein is intended to include all types of paint and coating materials, flat or gloss, synthetic, lacquers, baking enamels, wrinkle finishes and the like. The heating and circulating system is obviously not limited in utility to the spraying of paint, but may also be utilized for the controlled spraying of other liquids, such as insecticides or lubricants, or generally for the supply of uniformly heated material to an outlet for other than spraying purposes.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. A heating device for continuously maintaining a flowing fluid between close limits of temperature variation comprising, a hermetically sealed vessel, heating means positioned adjacent the exterior of the vessel, an elongated conduit passing through the vessel and so positioned within the vessel as to be at least partially surrounded by the vapor phase of a heat-transfer medium contained in the vessel, means to flow fluid to be heated through the conduit, means to energize the heating means to maintain the medium at least partially in its vapor phase, and pressure responsive means communicating with the vessel and connected to the heating means to automatically control the latter means to regulate the temperature of the fluid passing through the conduit.

2. A heating device for continuously maintaining a flowing fluid between close limits of temperature variation comprising, a hermetically sealed vessel, heating means positioned adjacent the lower portion of the exterior of the vessel, a coil conduit passing through the vessel and so positioned within the vessel as to be at least partially surrounded by the vapor phase of a heat-transfer medium contained in the vessel, means to flow fluid to be heated through the conduit, means to energize the heating means to maintain the medium partially in its vapor phase and partially in its liquid phase, and pressure responsive means communicating with the vessel and connected to the heating means to automatically control the temperature of fluid flowed through the conduit.

GLEN W. MILLER.
FRED S. MILLER.

REFERENCES CITED

The following references are of record in the file of this patent:

UNITED STATES PATENTS

| Number | Name | Date |
|---|---|---|
| 884,540 | Thomson | Apr. 14, 1908 |
| 1,560,528 | Baum | Nov. 10, 1925 |
| 1,792,551 | Rice et al. | Feb. 17, 1931 |
| 1,983,140 | McCathron | Dec. 4, 1934 |
| 2,123,604 | Johnson | July 12, 1938 |
| 2,378,184 | Carlson | June 12, 1945 |
| 2,481,813 | Bede | Sept. 13, 1949 |

FOREIGN PATENTS

| Number | Country | Date |
|---|---|---|
| 608,376 | Great Britain | Sept. 14, 1948 |